US011841580B2

(12) United States Patent
Zhou et al.

(10) Patent No.: US 11,841,580 B2
(45) Date of Patent: Dec. 12, 2023

(54) BACKLIGHT MODULE AND DISPLAY DEVICE WITH A REFLECTOR AT THE SEAM OF TWO ADJACENT LIGHT BOARDS

(71) Applicant: WUHAN CHINA STAR OPTOELECTRONICS TECHNOLOGY CO., LTD., Wuhan (CN)

(72) Inventors: Zheng Zhou, Wuhan (CN); Suimang Song, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 360 days.

(21) Appl. No.: 17/267,787

(22) PCT Filed: Dec. 31, 2020

(86) PCT No.: PCT/CN2020/142337
§ 371 (c)(1),
(2) Date: Feb. 10, 2021

(87) PCT Pub. No.: WO2022/141479
PCT Pub. Date: Jul. 7, 2022

(65) Prior Publication Data
US 2022/0397795 A1    Dec. 15, 2022

(30) Foreign Application Priority Data
Dec. 30, 2020    (CN) .......................... 202011604175.5

(51) Int. Cl.
*G02F 1/13357*    (2006.01)

(52) U.S. Cl.
CPC .. *G02F 1/133605* (2013.01); *G02F 1/133603* (2013.01); *G02F 1/133608* (2013.01); *G02F 1/133606* (2013.01)

(58) Field of Classification Search
CPC ......... G02F 1/133605; G02F 1/133603; G02F 1/133608; G02F 1/133606; G02F 1/133602; G02F 1/133308
See application file for complete search history.

(56) References Cited

U.S. PATENT DOCUMENTS

2020/0341333 A1*  10/2020  Qiu .................... F21V 31/005
2022/0003388 A1*   1/2022  Liu .................... F21V 19/005

FOREIGN PATENT DOCUMENTS

CN    204943151 U    1/2016
CN    110133914 A    8/2019
(Continued)

OTHER PUBLICATIONS

CN210720954U_machine translation 2020 (Year: 2020).*
(Continued)

*Primary Examiner* — Tracie Y Green
(74) *Attorney, Agent, or Firm* — PV IP PC; Wei Te Chung; Zhigang Ma

(57) ABSTRACT

A backlight module and a display device are provided. The backlight module includes a plurality of light boards spliced together and a reflector corresponding to a seam of two adjacent light boards. By disposing the reflector at the seam of the two adjacent light boards, a reflection performance of light at the seam is improved and a shadow problem at the seam is improved.

6 Claims, 3 Drawing Sheets

(56) References Cited

FOREIGN PATENT DOCUMENTS

| CN | 110333628 A | * | 10/2019 | ............... G02B 6/00 |
|---|---|---|---|---|
| CN | 110346971 A | | 10/2019 | |
| CN | 210223358 U | | 3/2020 | |
| CN | 210720954 U | | 6/2020 | |
| WO | WO-2015192419 A1 | * | 12/2015 | ........... G02F 1/1333 |

OTHER PUBLICATIONS

Xue, CN204943151U, machine translation Jun. 2016 (Year: 2016).*
Li, CN-110333628-A, machine translation (Year: 2019).*
International Search Report in International application No. PCT/CN2020/142337, dated Sep. 18, 2021.
Written Opinion of the International Search Authority in International application No. PCT/CN2020/142337, dated Sep. 22, 2021.
Chinese Office Action for utility model patent issued in corresponding Chinese Patent Application No. 202023277708.1 dated Jun. 29, 2021, pp. 1-2.

* cited by examiner

BACKLIGHT MODULE AND DISPLAY DEVICE WITH A REFLECTOR AT THE SEAM OF TWO ADJACENT LIGHT BOARDS

RELATED APPLICATIONS

This application is a Notional Phase of PCT Patent Application No. PCT/CN2020/142337 having international filing date of Dec. 31, 2020, which claims the benefit of priority of Chinese Patent Application No. 202011604175.5 filed on Dec. 30, 2020. The contents of the above applications are all incorporated by reference as if fully set forth herein in their entirety.

FIELD OF DISCLOSURE

The present disclosure relates to the field of display technologies, in particular to a backlight module and a display device.

BACKGROUND

At present, for vehicle-mounted large-size sub-millimeter light-emitting diode (mini-LED) backlight modules, light boards of the sub-millimeter light-emitting diode backlight module usually adopt splicing light boards. That is, a plurality of light boards are spliced together into a whole light board as a backlight source. Due to a limitation of a light propagation path of a direct-lit backlight source, the large-size sub-millimeter light-emitting diode backlight module adopts a splicing board design, and a processing of a seam formed by splicing two adjacent light boards is a problem currently encountered. Due to the seam, a splicing position of the direct-lit backlight source is darker, which appears as a dark shadow or dark area on an optical product, thereby affects visual performance.

Therefore, it is necessary to propose a technical solution to improve the shadow or dark area problem caused by a seam formed by splicing the light boards.

SUMMARY OF DISCLOSURE

A purpose of the present disclosure is to provide a backlight module and a display device to improve a problem of dark shadows or dark areas caused by a seam formed by splicing light boards.

A backlight module includes:
a plurality of light boards spliced together; and
a reflector corresponding to a seam of two adjacent light boards.

In the above backlight module, one end of the reflector away from the light boards includes a convex curved surface.

In the above backlight module, a portion of the reflector is disposed above the two adjacent light boards.

In the above backlight module, each of the light boards includes a mounting surface and a plurality of light-emitting elements.

The plurality of light-emitting elements are fixed on the mounting surface of each of the light boards.

A distance between an end of the reflector away from the light boards and the mounting surface is less than or equal to 0.5 mm and greater than 0 mm.

In the above backlight module, the backlight module further includes:
a backplate, where the plurality of light boards are disposed on the backplate; and
a connecting element disposed at the seam of the two adjacent light boards, and connecting the reflector to the backplate.

In the above backlight module, the backlight module further includes a slot formed from surrounding the connecting element, the reflector, and the backplate, wherein ends of the two adjacent light boards close to the connecting element are engaged in the slot.

In the above backlight module, each of the light boards includes a mounting surface and a plurality of light-emitting elements.

The plurality of light-emitting elements are fixed on the mounting surface of each of the light boards. A distance between an end of the reflector connecting to the connecting element and the mounting surface ranges from 0.15 mm to 0.25 mm.

In the above backlight module, the backlight module further includes:
an inner sealant disposed on the light boards, wherein the reflector is connected to the inner sealant.

In the above backlight module, the inner sealant includes a first step surface and a second step surface, the second step surface is disposed on a side of the first step surface away from the light boards, and the backlight module further includes:
a diffuser disposed on the first step surface; and
an optical film disposed on the second step surface.

A display device includes the above-mentioned backlight module and a liquid crystal display panel. The liquid crystal display panel is disposed on a light-emitting side of the backlight module.

The present disclosure provides a backlight module and a display device. The backlight module includes the plurality of light boards spliced together and the reflector corresponding to the seam of the two adjacent light boards. By disposing the reflector at the seam of the two adjacent light boards, a reflection performance of light at the seam is improved and a shadow problem at the seam is improved.

DETAILED DESCRIPTION

The technical solutions in embodiments of the present disclosure will be clearly and completely described below in conjunction with the drawings in the embodiments of the present disclosure. Apparently, the described embodiments are only a part of embodiments of the present disclosure, rather than all the embodiments. Based on the embodiments in the present disclosure, all other embodiments obtained by those skilled in the art without creative efforts shall fall within the protection scope of the present disclosure.

First Embodiment

Figure 1:
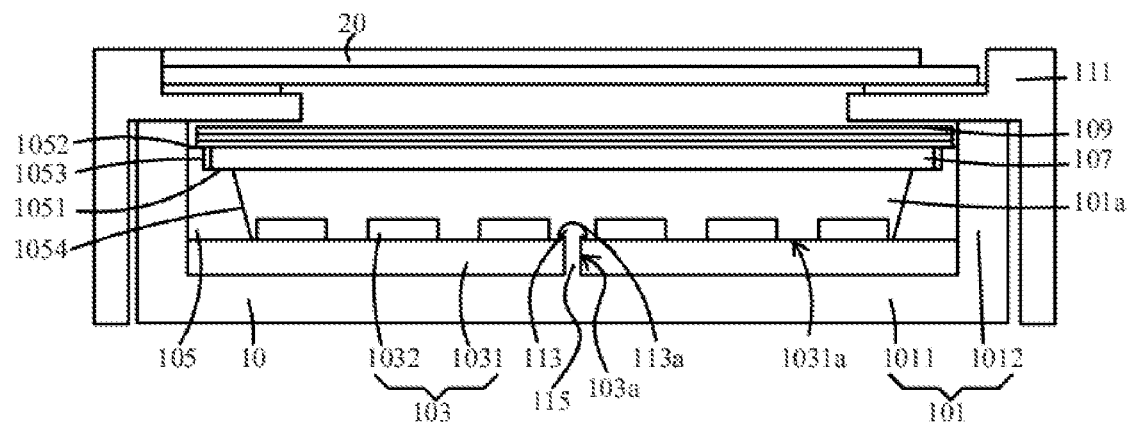
FIG. 1 is a schematic diagram of a display device of a first embodiment of the present disclosure
Figure 2:
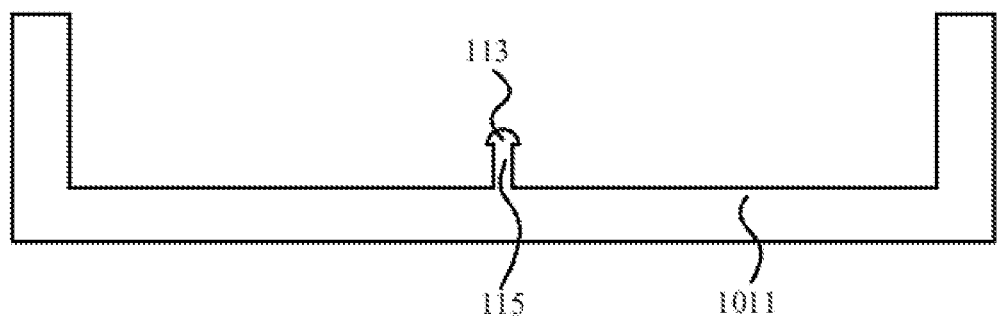
FIG. 2 is a plan view of a reflector connected to a backplate shown in FIG. 1
Figure 3:
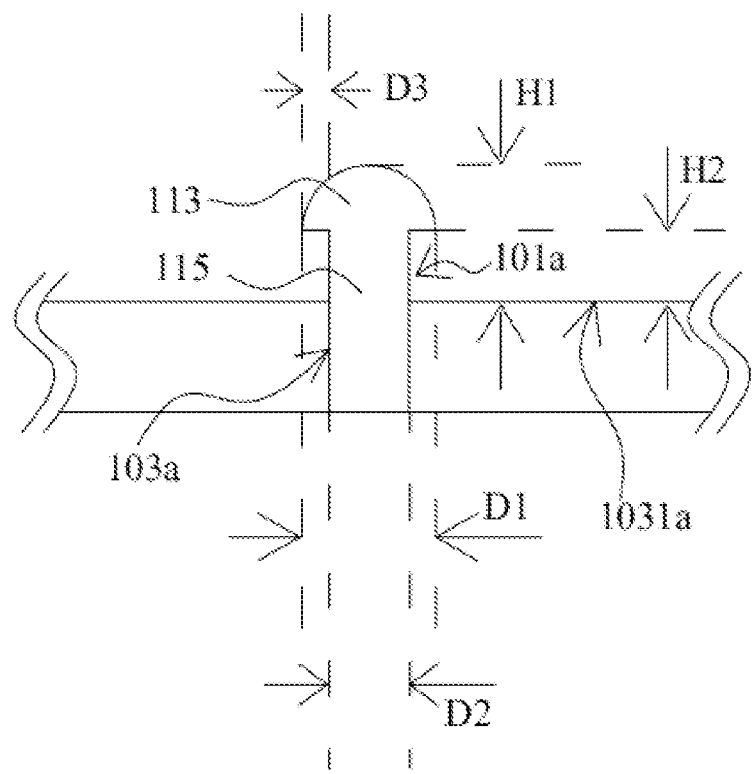
FIG. 3 is a partial enlarged view of the display device shown in FIG. 1

Please refer to FIG. 1 to FIG. 3, FIG. 1 is a schematic diagram of a display device of a first embodiment of the present disclosure, FIG. 2 is a plan view of a reflector connected to a backplate shown in FIG. 1, and FIG. 3 is a partial enlarged view of the display device shown in FIG. 1. A display device 300 includes a backlight module 10 and a liquid crystal display panel 20. The display device 300 can be applied to vehicle displays or televisions. The liquid crystal display panel 20 is disposed on a light-emitting side of the backlight module 10. The backlight module 10 is configured to provide a backlight source for the liquid crystal display panel 20. The liquid crystal display panel 20 receives the backlight and controls a transmittance of the backlight, thereby displaying images with different gray levels.

In this embodiment, the liquid crystal display panel 20 includes an array substrate, a color filter substrate, and a liquid crystal layer disposed between the array substrate and the color filter substrate.

In this embodiment, the backlight module 10 includes a backplate 101, a plurality of light boards 103, an inner sealant 105, a diffuser 107, an optical film 109, an outer frame 111, and a reflector 113.

In this embodiment, the backplate 101 includes a bottom plate 1011 and four side plates 1012 arranged around the bottom plate 1011. The bottom plate 1011 and the four side plates 1012 surround to form an accommodating space 101a. The backplate 101 is made of aluminum alloy or plastic.

In this embodiment, the plurality of light boards 103 are spliced with each other to provide a large-size surface light source. The plurality of light boards 103 are arranged in the accommodating space 101a of the backplate 101 and disposed on the bottom plate 1011. Each light board 103 includes a printed circuit board (PCB) 1031 and a plurality of light-emitting elements 1032 disposed on the printed circuit board 1031 in an array. The printed circuit board 1031 has a mounting surface 1031a. Each light-emitting element 1032 is fixed on the mounting surface 1031a of the printed circuit board 1031. The light-emitting elements 1032 and the printed circuit board 1031 can be connected by solder paste or conductive glue. The mounting surface 1031a of the printed circuit board 1031 is provided with a reflective layer (not shown) to reflect light and improve light utilization. The light-emitting elements 1032 are sub-millimeter light-emitting diodes. It can be understood that the light-emitting elements 1032 may also be micro-LEDs or other light-emitting elements.

In this embodiment, the reflector 113 corresponds to a seam 103a of two adjacent light boards 103, and a light at the seam 103a is reflected by the reflector 113 to increase brightness at the seam 103a and improve a dark shadow or dark area problem at the seam 103a. The reflector 113 can be made of transparent plastic to avoid blocking the light.

The reflector 113 has a convex curved surface 113a at one end away from the light boards 103. In one aspect, in comparison to the end of the reflector 113 away from the light boards 103 is a cube, the reflector 113 with the convex curved surface can have a better reflective performance on the light at the seam 103a. In another aspect, in comparison to the end of the reflector 113 away from the light boards 103 is the cube, the light-emitting elements 1032 emit light within a specific angle range, and the reflector 113 with the convex curved surface can avoid blocking the light emitted from the light-emitting elements 1032 to the seam 103a. Specifically, in this embodiment, the reflector 113 has a convex arc-shaped curved surface at the end away from the light boards 103. In other embodiments, the end of the reflector 113 away from the light boards 103 may also have a convex elliptical curved surface.

In this embodiment, a portion of the reflector 113 is disposed above the two adjacent light boards 103. That is, a width D1 of the reflector 113 is greater than a width of the seam 103a of the two adjacent light boards 103, so that the reflector 113 completely shields the seam 103a. Specifically, as shown in FIG. 3, the width D1 of the reflector 113 ranges from 0.4 mm to 0.6 mm, for example, the width D1 of the reflector 113 may be 0.5 mm.

In this embodiment, a distance H1 between the end of the reflector 113 away from the light boards 103 and the mounting surface 1031a is less than or equal to 0.5 mm and greater than 0 mm. It avoids that a height of the reflector 113 is too high to block the light emitted by the light-emitting elements 1032, which will cause the light emitted by the light-emitting elements 1032 to fail to reach the seam 103a. For example, the distance H1 can be 0.4 mm, 0.3 mm, or 0.2 mm.

In this embodiment, the backlight module 10 further includes a connecting element 115. The connecting element 115 is disposed at the seam 103a between two adjacent light boards 103. The connecting element 115 connects the reflector 113 and the backplate 101. The reflector 113 is connected with the backplate 101 to stabilize the reflector 113 and prevent the reflector 113 from moving. A shape of the connecting element 115 is a cube. The connecting element 115 may be made of plastic. The connecting element 115 and the reflector 113 can be formed with one piece element. A width D2 of the connecting element 115 is greater than 0 and less than or equal to 0.3 mm. It is beneficial to reduce a distance between two adjacent light-emitting elements 1032 respectively disposed on two adjacent light boards 103. For example, the width of connecting element 115 is 0.1 mm.

In this embodiment, a slot 101a is formed from surrounding the connecting element 115, the reflector 113, and the backplate 101. Ends of the two adjacent light boards 103 close to the connecting element 115 are engaged in the slot 101a to prevent the light boards 103 from moving. A width D3 of the slot 101a is greater than or equal to 0.2 mm and less than the width of the reflector 113, so that when the light boards 103 are engaged in the slot 101a, it is beneficial for the reflector 113 to cover edges of the light boards 103 close to the seam.

Furthermore, a distance H2 between a end of the reflector 113 connecting with the connecting element 115 and the mounting surface 1031a ranges from 0.15 mm to 0.25 mm, so that a space is reserved for the light boards 103 to be engaged into the slot 101a. For example, the distance H2 between the end of the reflector 113 connecting with the connecting element 115 and the mounting surface 1031a is 0.2 mm.

In this embodiment, the inner sealant 105 is disposed within the accommodating space 101a and disposed on peripheral edges of the plurality of light boards 103. The inner sealant 105 has a first step surface 1051, a second step surface 1052, a connecting surface 1053, and an inclined surface 1054. The second step surface 1052 is disposed on a side of the first step surface 1051 away from the light boards 103. The connecting surface 1053 is connected between the first step surface 1051 and the second step surface 1052. The connecting surface 1053 is parallel to the side plates 1012 of the backplate 101. The first step surface 1051 and the second step surface 1052 are parallel to the bottom plate 1011 of the backplate 101. The inclined surface 1054 is connected to the first step surface 1051. An angle between the inclined surface 1054 and the first step surface 1051 is an obtuse angle. The inclined surface 1054 can reflect light. The inner sealant 105 is made of plastic.

In this embodiment, the diffuser 107 is disposed on the first step surface 1051. The optical film 109 is disposed on the second step surface 1052. The diffuser 107 is configured to scatter the light emitted by multiple light-emitting elements 1032. The optical film 109 includes but is not limited to a brightness enhancement film.

In this embodiment, the outer frame 111 is disposed on the backplate 101. The outer frame 111 is fixed on the side plate s1012 of the backplate 101. The outer frame 111 includes a step surface. The liquid crystal display panel 20 is fixed on the outer frame 111 by a double-sided tape. The outer frame 111 can be made of plastic or metal.

The display device of the present disclosure is provided with the reflector at the seam of two adjacent light boards to improve the utilization of light at the seam, thereby increasing the brightness of the seam.

Second Embodiment

Figure 4:
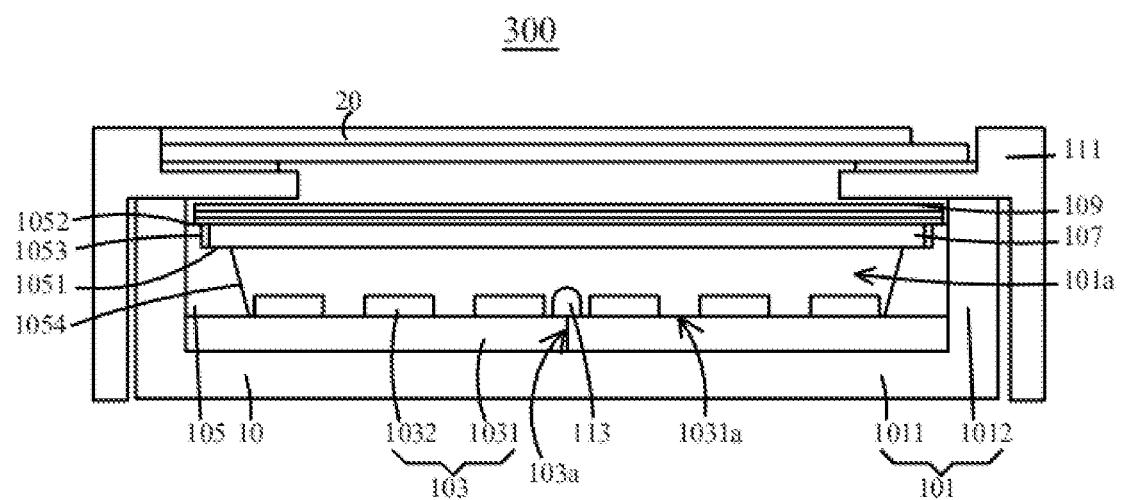
FIG. 4 is a schematic diagram of a display device of a second embodiment of the present disclosure.
Figure 5:
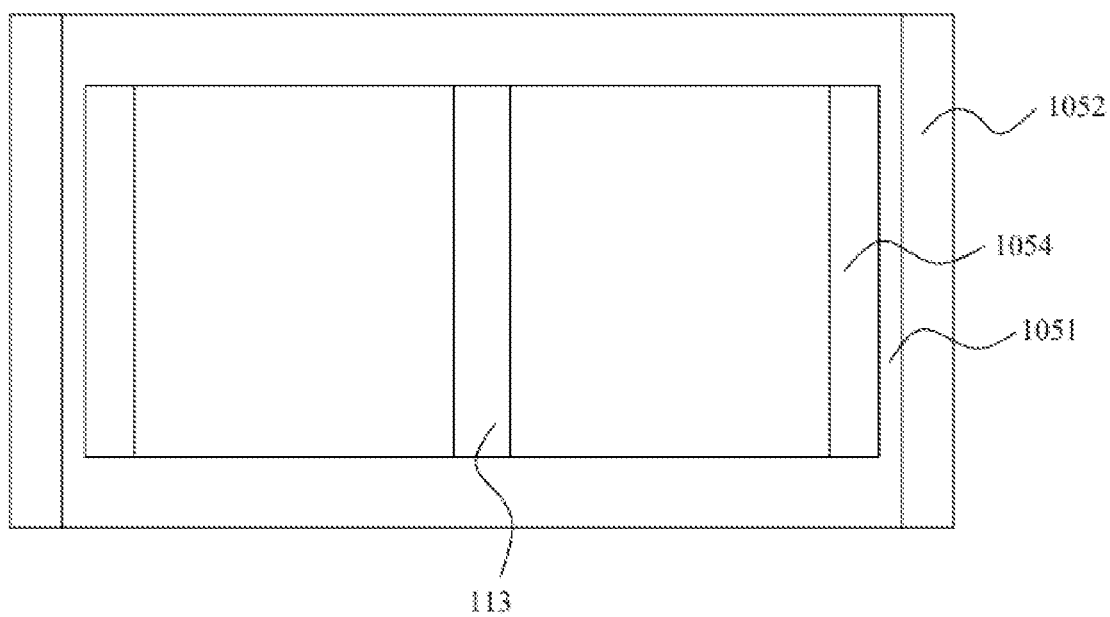
FIG. 5 is a plan view of a reflector connected to an inner sealant shown in FIG. 4.

Referring to FIG. 4 and FIG. 5, FIG. 4 is a schematic diagram of a display device of a second embodiment of the present disclosure, and FIG. 5 is a plan view of a reflector connected to an inner sealant shown in FIG. 4. The display device shown in FIG. 4 is basically similar to the display device shown in FIG. 1. The reflector 113 is correspondingly arranged at the seam 103a of the two adjacent light boards 103, and the reflector 113 is disposed on the edge of the two adjacent light boards 103 close to the seam 103a. A difference of both is that the reflector 113 is connected to the inner sealant 105. The reflector 113 serves as a beam of the inner sealant 105 and covers the seam 103a of two adjacent light boards 103.

In the display device of the embodiment of the present disclosure, the inner sealant is connected to the reflector, so that the reflector reflects the light at the seam. Therefore, the brightness at the seam is improved, the problem of dark lines or dark areas at the seam is improved, and a shift of the reflector is avoided. In addition, the reflector is disposed on edges of two adjacent light boards close to the seam, which can prevent the light boards from moving.

The description of the above embodiments is only used to help understand the technical solutions and core idea of the present disclosure. Those of ordinary skill in the art should understand that they can still modify the technical solutions descripted in the foregoing embodiments, or equivalently replace some of the technical features. These modifications or replacements do not cause the essence of the corresponding technical solutions to deviate from the scope of the technical solutions of the embodiments of the present disclosure.

What is claimed is:

1. A backlight module, comprising:
    a plurality of light boards spliced together;
    a reflector corresponding to a seam of two adjacent light boards, wherein the reflector is correspondingly arranged at the seam of the two adjacent light boards, the reflector is disposed on the edge of the two adjacent light boards close to the seam, the reflector is disposed above the two adjacent light boards, and one end of the reflector away from the light boards comprises a convex curved surface; and
    an inner sealant disposed on the light boards, wherein the reflector is connected to the inner sealant, and the reflector serves as a beam of the inner sealant and covers the seam of the two adjacent light boards.

2. The backlight module according to claim 1, wherein each of the light boards comprises a mounting surface and a plurality of light-emitting elements;
    wherein the plurality of light-emitting elements are fixed on the mounting surface of each of the light boards; and
    wherein a distance between an end of the reflector away from the light boards and the mounting surface is less than or equal to 0.5 mm and greater than 0 mm.

3. The backlight module according to claim 1, wherein the inner sealant comprises a first step surface and a second step surface, the second step surface is disposed on a side of the first step surface away from the light boards, and the backlight module further comprises:
    a diffuser disposed on the first step surface; and
    an optical film disposed on the second step surface.

4. A display device, comprising a backlight module and a liquid crystal display panel, wherein the liquid crystal display panel is disposed on a light-emitting side of the backlight module, and the backlight module comprises:
    a plurality of light boards spliced together;
    a reflector corresponding to a seam of two adjacent light boards, wherein the reflector is correspondingly arranged at the seam of the two adjacent light boards, the reflector is disposed on the edge of the two adjacent light boards close to the seam, the reflector is disposed above the two adjacent light boards, and one end of the reflector away from the light boards comprises a convex curved surface; and
    an inner sealant disposed on the light boards, wherein the reflector is connected to the inner sealant, and the reflector serves as a beam of the inner sealant and covers the seam of the two adjacent light boards.

5. The display device according to claim 4, wherein each of the light boards comprises a mounting surface and a plurality of light-emitting elements;
    wherein the plurality of light-emitting elements are fixed on the mounting surface of each of the light boards; and
    wherein a distance between an end of the reflector away from the light boards and the mounting surface is less than or equal to 0.5 mm and greater than 0 mm.

6. The display device according to claim 4, wherein the inner sealant comprises a first step surface and a second step surface, the second step surface is disposed on a side of the first step surface away from the light boards, and the backlight module further comprises:
    a diffuser disposed on the first step surface; and
    an optical film disposed on the second step surface.

* * * * *